UNITED STATES PATENT OFFICE.

JOSEPH W. ENGLAND, OF PHILADELPHIA, PENNSYLVANIA, ASSIGNOR TO SMITH, KLINE & FRENCH CO., OF PHILADELPHIA, PENNSYLVANIA, A CORPORATION OF PENNSYLVANIA.

DISINFECTING COMPOUND.

No. 817,136.      Specification of Letters Patent.      Patented April 10, 1906.

Application filed September 20, 1904. Serial No. 225,187. (Specimens.)

*To all whom it may concern:*

Be it known that I, JOSEPH W. ENGLAND, of Philadelphia, in the State of Pennsylvania, have invented a certain new and useful Antiseptic or Disinfecting Compound, of which the following is a specification.

My invention relates to a new chemical compound containing mercuric iodid and lithium iodid in such chemical combination as to be soluble in water without decomposition. I term the new compound "lithiomercuric iodid." It possesses very powerful antiseptic and disinfecting properties.

The compound is prepared by dissolving mercuric iodid ($HgI_2$) in an aqueous solution of lithium iodid, ($LiI$.)

In order to produce a double iodid of lithium and mercury which shall be soluble in water without decomposition, I have found that the addition of three molecules (400.62 parts, by weight) of lithium iodid to one molecule (452.86 parts, by weight) of mercuric iodid gives the most satisfactory results. Such a compound is soluble in water without any separation or cloudiness and is not affected by dilution of the solution. From a solution containing the compound made as just stated evaporation will leave the new compound in homogeneous lemon-yellow crystals. If absolute purity is desired, the crystals may be dissolved in alcohol or ether, filtered, and the filtrate crystallized or evaporated to dryness. By this means there is left on the filter a slight grayish or brownish residue; but I find that somewhat less than 400.62 parts, by weight, of lithium iodid can be brought into clear solution with the amount of mercuric iodid mentioned, as little as 333.85 parts, by weight, corresponding to two and one-half molecules of lithium iodid, having been successfully used. A quantitative analysis of the product indicates that the chemical composition of the purified crystals is two and one-half molecules of lithium iodid combined with one molecule of mercuric iodid. The reaction may therefore be represented as follows:

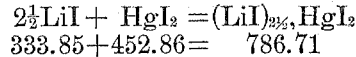
$$2\tfrac{1}{2}LiI + HgI_2 = (LiI)_{2\tfrac{1}{2}}, HgI_2$$
$$333.85 + 452.86 = 786.71$$

or

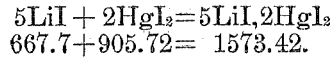
$$5LiI + 2HgI_2 = 5LiI, 2HgI_2$$
$$667.7 + 905.72 = 1573.42.$$

Experiments further show that one molecule of lithium iodid dissolved in water will not dissolve one molecule of mercuric iodid after continued boiling. The addition to the boiling solution of one molecule more of lithium iodid effects solution, and from this a red compound, different from mine, is obtainable by evaporation to thorough dryness; but on further diluting with water the solution in which this compound is formed mercuric iodid is precipitated, showing that the compound $(LiI)_2, HgI_2$ is incompatible with water and for this reason not adapted for germicidal purposes.

The water-soluble compound which I have discovered crystallizes in masses of lemon-yellow needles that contain considerable water of crystallization and are exceedingly deliquescent on exposure to air. When the crystals are heated, they first give off water and then melt into a reddish liquid, from which mercuric iodid separates. It is soluble without decomposition in all proportions of water, very soluble in alcohol, and soluble in ether. The aqueous solution of the compound is an exceptionally delicate precipitant of the vegetable alkaloids. It is more powerful than mercuric chlorid or the usual mercuric salts in its action on bacteria and their toxins and can be used as a disinfectant against all forms of infection. When the solution is used as a disinfectant, it does not form insoluble and inert compounds with blood-serum, albumins, fixed alkalies, or ammonia, as does corrosive-sublimate solution. It is not corrosive, and the compound containing only about one-third as much combined mercury as corrosive sublimate is much less poisonous. By reason of the fact that it is not readily decomposed by the substances usually accompanying bacteria its destructive influence on bacterial life is much more positive and uniform, a less quantity being required to perform a given amount of work, and as a result of this, as well as the presence of iodin, which stimulates the elimination of mercury and the products of retrograde cellular changes, the danger of mercurial poisoning by absorption is reduced to a minimum.

Having thus described my invention, I claim—

A lithiomercuric-iodid compound consisting of mercuric iodid and lithium iodid in chemical combination forming lemon-yellow crystals, and characterized by deliquescence, and solubility, without decomposition, in water, in alcohol, or in ether.

In witness whereof I have hereunto signed my name, at Philadelphia, Pennsylvania, this 16th day of September, 1904.

JOSEPH W. ENGLAND.

Witnesses:
 JAMES H. BELL,
 EVA L. FULLERTON.